(12) United States Patent
Mori et al.

(10) Patent No.: US 10,428,813 B2
(45) Date of Patent: Oct. 1, 2019

(54) STATE MONITORING SYSTEM OF MOVING APPARATUS

(71) Applicants: TOKUYAMA CORPORATION, Yamaguchi (JP); YAMAGUCHI UNIVERSITY, Yamaguchi (JP)

(72) Inventors: Yoshifumi Mori, Yamaguchi (JP); Takashi Saito, Yamaguchi (JP)

(73) Assignees: Tokuyama Corporation, Yamaguchi (JP); Yamaguchi University, Yamaguchi (JP)

( * ) Notice: Subject to any disclaimer, the term of this patent is extended or adjusted under 35 U.S.C. 154(b) by 172 days.

(21) Appl. No.: 15/038,856

(22) PCT Filed: Nov. 18, 2014

(86) PCT No.: PCT/JP2014/080485
§ 371 (c)(1),
(2) Date: May 24, 2016

(87) PCT Pub. No.: WO2015/079975
PCT Pub. Date: Jun. 4, 2015

(65) Prior Publication Data
US 2016/0377076 A1 Dec. 29, 2016

(30) Foreign Application Priority Data
Nov. 26, 2013 (JP) ................................. 2013-244250

(51) Int. Cl.
*F04B 51/00* (2006.01)
*F04B 49/06* (2006.01)
(Continued)

(52) U.S. Cl.
CPC .............. *F04B 51/00* (2013.01); *F04B 37/18* (2013.01); *F04B 39/0022* (2013.01);
(Continued)

(58) Field of Classification Search
CPC .......... F04B 51/00; F04B 49/06; F04B 39/00; F04B 38/00; F04B 37/18; F04B 39/0022;
(Continued)

(56) References Cited

U.S. PATENT DOCUMENTS

| 2005/0197834 | A1* | 9/2005 | Hatch | ..................... G05B 17/02 704/225 |
| 2011/0072964 | A1* | 3/2011 | Gerbi | ..................... F04B 51/00 92/5 R |

(Continued)

FOREIGN PATENT DOCUMENTS

| JP | 2002-372452 A | 12/2002 |
| JP | 2005-326399 A | 11/2005 |

(Continued)

OTHER PUBLICATIONS

International Search Report for corresponding International Application No. PCT/JP2014/080485 dated Feb. 17, 2015.

*Primary Examiner* — Regis J Betsch
*Assistant Examiner* — Kaleria Knox
(74) *Attorney, Agent, or Firm* — Renner, Otto, Boisselle & Sklar, LLP

(57) ABSTRACT

There is provided a state-monitory system of a moving apparatus which is capable of deducing an abnormality and cause of breakdown of the moving apparatus by Equationematical analysis only by measuring vibration of a casing or object to be monitored and which requires no large-scaled apparatus.
An equivalent model of the moving apparatus 1 is formed, which is adapted to replace the vibration of a monitored object of the moving apparatus 1 with the vibration of a viscoelastic member such as an elastic spring etc. and which is adapted to be capable of outputting virtual vibration data having synthesized vibration equivalent to the vibration of the viscoelastic member, and the equivalent model is Equa- (Continued)

tionematically analyzed, thereby estimating the abnormality and cause of breakdown of the moving apparatus 1 only by measuring vibration of the casing 8 or a monitored object.

12 Claims, 8 Drawing Sheets

(51) Int. Cl.

| | |
|---|---|
| *G01H 1/00* | (2006.01) |
| *G01M 7/00* | (2006.01) |
| *F04B 39/00* | (2006.01) |
| *F04B 49/10* | (2006.01) |
| *F04B 37/18* | (2006.01) |
| *G05B 23/02* | (2006.01) |

(52) U.S. Cl.
CPC ............. *F04B 49/06* (2013.01); *F04B 49/10* (2013.01); *G01H 1/00* (2013.01); *G01H 1/003* (2013.01); *G01M 7/00* (2013.01); *G05B 23/0232* (2013.01)

(58) Field of Classification Search
CPC ..... F04B 49/10; G05B 49/06; G05B 23/0232; B67D 3/0003; G01H 1/00; G01M 7/00
USPC ....................... 92/5 R; 417/298, 63; 704/225
See application file for complete search history.

(56) References Cited

U.S. PATENT DOCUMENTS

| | | | |
|---|---|---|---|
| 2012/0134850 A1* | 5/2012 | Grant | F04B 39/00 417/63 |
| 2013/0299000 A1* | 11/2013 | Gillette, II | B67D 3/0003 137/2 |
| 2014/0294619 A1* | 10/2014 | Mangiagli | F04B 49/06 417/298 |

FOREIGN PATENT DOCUMENTS

| | | |
|---|---|---|
| JP | 2011-075556 A | 4/2011 |
| JP | 2012-117522 A | 6/2012 |
| WO | WO 2011/121726 A1 | 10/2011 |

* cited by examiner

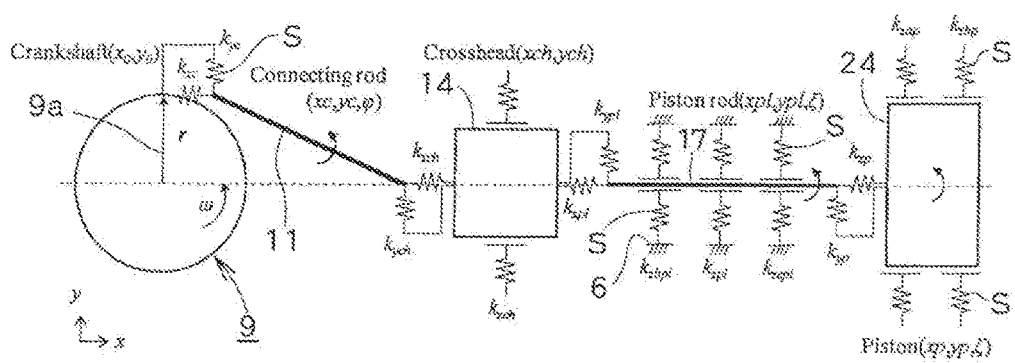

Simulation results
model parameters (before and after change)

| Spring | normal value [N/m] | abnormal time [N/m] |
|---|---|---|
| $k_{xc}$ | $1.82 \times 10^9$ | $1.82 \times 10^7$ |
| $k_{yc}$ | $2.40 \times 10^8$ | $2.40 \times 10^8$ |
| $k_{xch}$ | $1.82 \times 10^9$ | $1.50 \times 10^8$ |
| $k_{ych}$ | $2.11 \times 10^8$ | $2.00 \times 10^7$ |
| $k_{xpl}$ | $4.26 \times 10^8$ | $4.26 \times 10^8$ |
| $k_{ypl}$ | $2.49 \times 10^6$ | $2.49 \times 10^6$ |
| $k_{xp}$ | $4.26 \times 10^8$ | $4.26 \times 10^8$ |
| $k_{yp}$ | $2.49 \times 10^6$ | $2.49 \times 10^6$ |
| $k_{zch}$ | $3.25 \times 10^8$ | $3.10 \times 10^7$ |
| $k_{zpl}$ | $2.88 \times 10^7$ | $2.88 \times 10^7$ |
| $k_{zbpl}$ | $2.88 \times 10^7$ | $2.88 \times 10^7$ |
| $k_{xspl}$ | $2.88 \times 10^7$ | $2.88 \times 10^7$ |
| $k_{zbp}$ | $5.39 \times 10^7$ | $5.39 \times 10^7$ |
| $k_{zsp}$ | $5.39 \times 10^7$ | $5.39 \times 10^7$ | before and after time-wave form

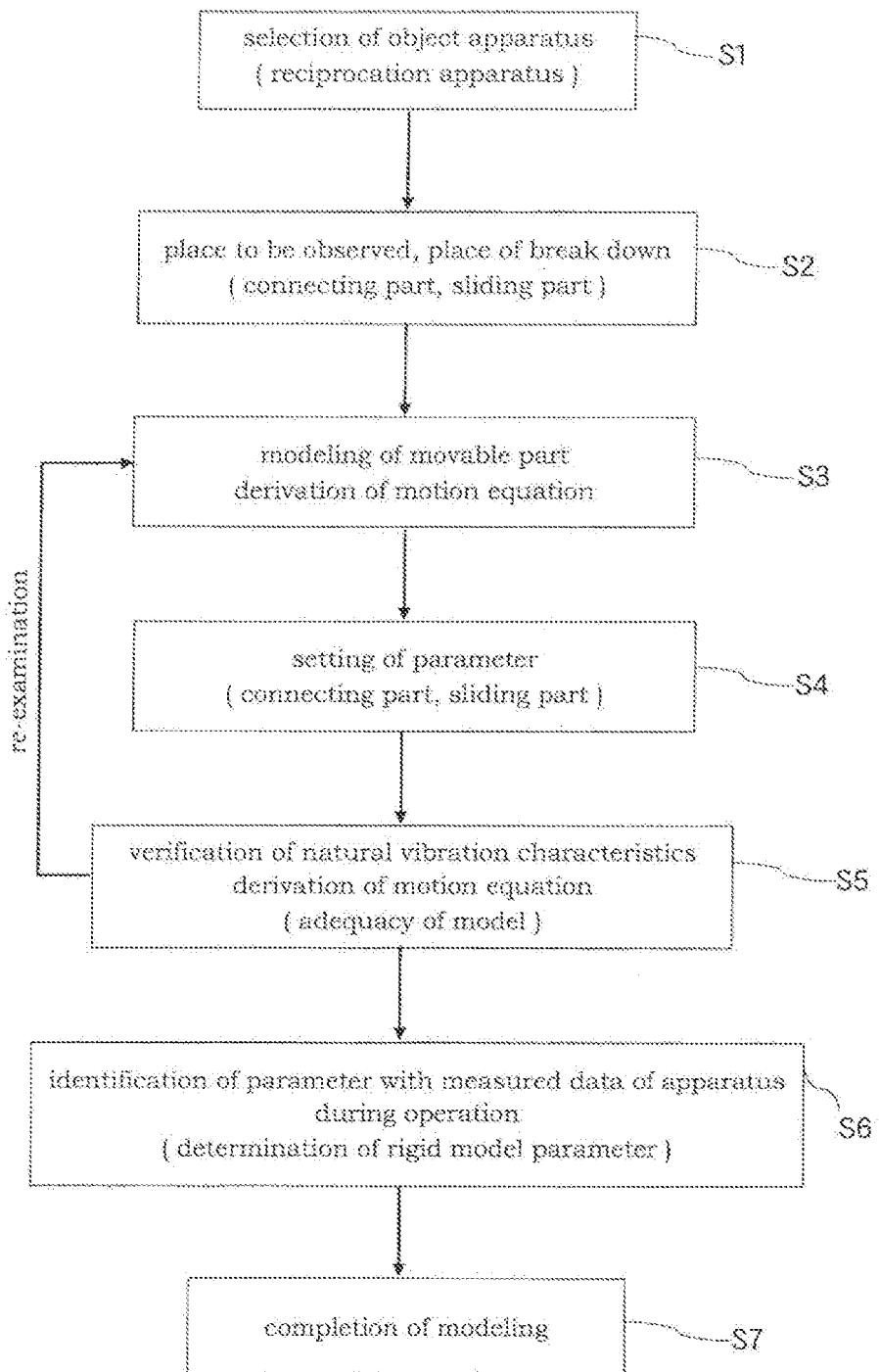

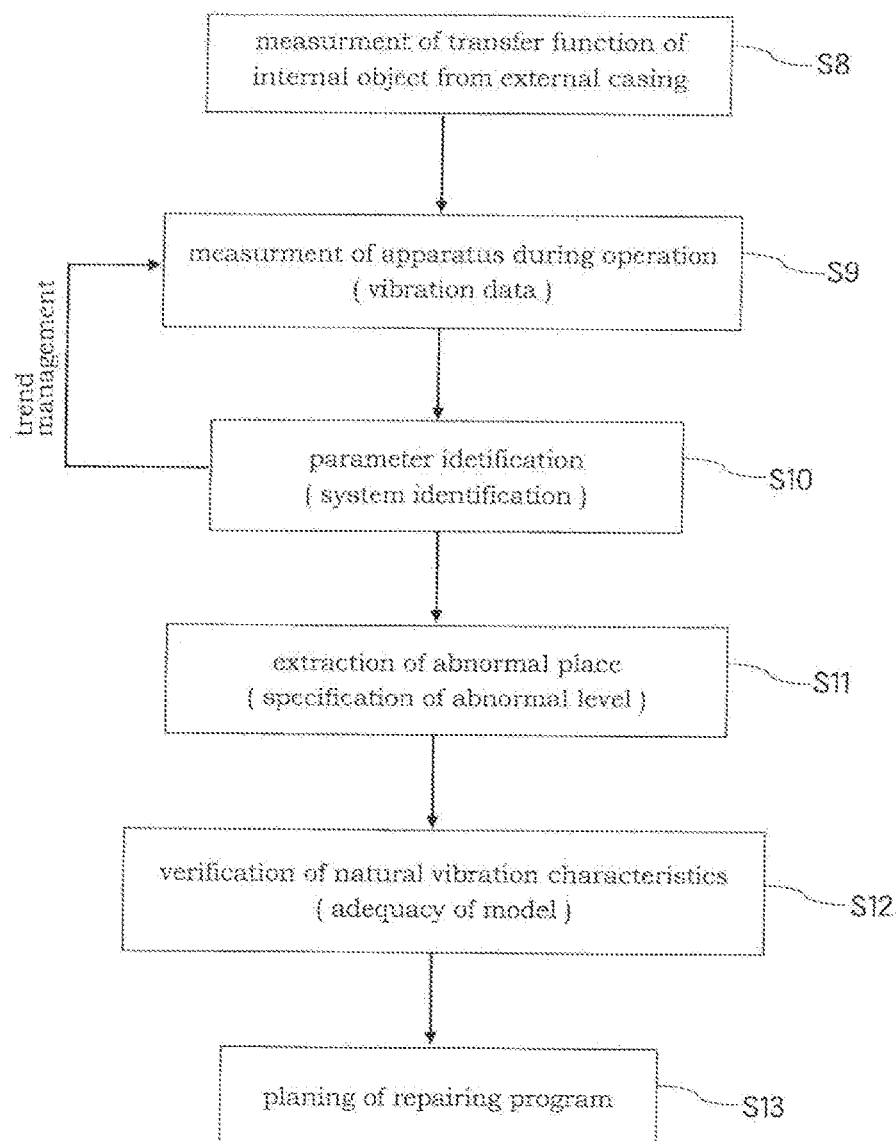

STATE MONITORING SYSTEM OF MOVING APPARATUS

TECHNICAL FIELD

This invention relates to a state monitoring system of a moving apparatus. In this invention, a term "moving apparatus" is defined as an apparatus providing with an element moving relatively between constituent elements of the apparatus; its typical one is a moving apparatus having a reciprocating-type mechanism such as reciprocating-type compressor etc.

BACKGROUND ART

In a chemical plant, a machine part-manufacturing factory, a food-manufacturing factory, etc., a reciprocating-type compressor is mainly used for compressing air or another gas.

For such a reciprocating moving apparatus, there has been an occurrence where an unexpected damage occurs during operation, thereby generating a great deal of damage such as shutdown, etc.

When a sudden trouble occurs for the reciprocating-type compressor, thousands~hundreds of millions/day of production loss occur; number of such cases may be about 100/year both inside and outside of the country. It has been presumed that almost all of causes of such damages are looseness of connecting portion of a crosshead or piston rod of the reciprocating-type compressor; or wear of a sliding part such as a piston ring, rider ring, piston rod packing, etc. or reduction of rigidity of the base of the reciprocating-type compressor. As an application for detecting such damages as described above, a continuous monitoring system for the reciprocating-type compressor is provided by GE (Bently) or Prognost SYSTEMS, HOERBIGER, etc.

Basically, functions of such three continuous monitoring systems are equivalent and they are designed in specialization of the protection of a machine and monitoring of the state and various diagnoses are made possible by the combination of the internal pressure and vibration of a cylinder with a crank angle. (For example; Patent Literature 1).
[Citation List]
[Patent Literature]
[PLT 1: Patent Publication (Toku-kai) 2012-117522]

SUMMARY OF INVENTION

Technical Problem

However, such conventional continuous monitoring systems as described above have never been used by a user inside the country; this is because that they are expensive and cost 10,000,000 yen/one machine and because of related laws and regulations inside the country. In case of a user outside the country, since there is no highly-advanced maintenance technique of a machine similar to that of Japan, it is actual state that such conventional continuous monitoring systems are used for compensation of not highly-advanced maintenance technique of a machine. In case of the current monitoring technique of the reciprocating-type compressor, a method has been generally used in which the impact peak of the time history response (maximum amplitude) is observed by a crank angle, which is, thereafter, related with the rod load (inertial force plus gas pressure) at a crank angle or cylinder pressure. There has been no method of specialization of the site or evaluation of degree.

At the present, a monitoring technique or operation-time measurement technique has been used for operation of a plant. However, troubles of failures are not decreased. It is presumed that there are mainly two reasons for this: one reason is that general-purpose and same evaluation is applied to all apparatus and the other reason is that since no occurring mechanism is clarified and states inside the plant is not able to be grasped, proper evaluation is not performed because of no criteria or standard.

Further, for the same type of apparatus, since each of apparatuses has inherent phenomena respectively depending on the installation location or environment or maintenance method. A technique for evaluating individually is required.

Furthermore, in a case of the reciprocating-type compressor, it is covered with a casing during operation and it is operated at high speed. It is, therefore, difficult to measure and grasp the repeated load generated inside the reciprocating-type compressor or acceleration fluctuation of each of movable parts by the use of actual apparatus. Therefore, a diagnostic technique into which a Equationematical model corresponding to the dynamic characteristics of the system or various types of parameters are introduced is necessary.

This invention was made in consideration of the above-described problems of prior arts. An object of this invention is to provide a state monitoring system of a moving apparatus requiring no large-scaled apparatus, which is capable of calculating the abnormalities of the moving apparatus and its failure causes by a Equationematical analysis only by measuring the vibration of the casing or by measuring the object to be monitored. Hereinafter, the wording "object to be monitored" is referred to as "monitored object" in some cases.

That is to say, according to this invention, in order to identify the internal vibration, the transfer constant of the quantity of the state generated at the positon inside the apparatus is calculated by experimental mode analysis to grasp characteristics of amplitude or phase affecting an exterior casing to perform input-identification. That is to say, this invention provides an analytical modeling technique capable of grasping the internal states by virtue of carrying out parameter diagnosis from numeral simulation by body dynamics analysis. In addition to that, this invention provides an analytical modeling technique by such a similar method as described above by measuring the vibration of the monitored object. The "vibration of the monitored object" herein used is defined as vibration caused by the characteristics of one or plural constituent members to be monitored and/or connecting parts between the constituent members and/or the sliding parts.

According to this invention, there are possibilities of predictive maintenance of an apparatus by preparing a novel monitoring technique and judgment criteria specialized in the reciprocating-type compressor.

Solution to Problem (A) Diagnostic Method based on the Parameter Identification:

In modeling of general piston-crankshaft system, one example is given that each of connecting parts is taken as rigid joint or lumped mass system. In that case, phenomena at the sliding part of the crosshead or the supporting part cannot be grasped. Therefore, the inventor of this invention considers that according to this model, by modeling the system comprising crankshaft-connecting rod-crosshead-cylinder rod-cylinder which are movable parts of the reciprocating-type compressor as an equivalent model connected by an elastic spring or spring constant and viscous damping coefficient, occurring mechanisms for each of phenomena can be clarified.

Specifically, by the use of harmonic response-data measured from an external casing or monitored parts, and by the use of the equivalent model formed by connecting the system comprising crankshaft-connecting rod-crosshead-cylinder rod-cylinder which are movable parts of the reciprocating-type compressor with an elastic spring or viscoelastic member of the elastic spring and a dashpot, spring constant and viscous damping coefficient, invers problems (parameter identification) using least squares method or down-hill simplex method, etc. are solved to calculate parameters of the spring constant or spring constant and viscous damping coefficient of each of the connecting parts (parameter identification), thereby making it possible to estimate the internal states of the movable parts of the reciprocating-type compressor by external measurement from the change in parameters.

When the states of the movable parts of the reciprocating-type compressor change, characteristic value obtained from the results of characteristic value analysis corresponding to the crank angle and frequency characteristics obtained from frequency analysis also change. By evaluating them comprehensively, it is possible to presume the internal states of the reciprocating-type compressor. The terminology "viscoelastic member" herein used means both only an elastic member and an elastic member plus a viscous member.

(B) Modeling of Reciprocating Apparatus

The reciprocating apparatus-object apparatus of this invention-comprises an electric motor, crankshaft, connecting rod, crosshead, piston rod, piston and casing (cylinder).

The object of this model is a system comprising a crankshaft-connecting rod -crosshead-piston rod-piston-cylinder, which are movable parts of the reciprocating-type compressor.

In the reciprocating apparatus, the frequencies of breakdowns of a connecting part and sliding part are high and such breakdowns bring about social and personal effects. Therefore, modeling is necessary for making it possible to observe (grasp) the change in the rigidity of the connecting part and sliding part. Accordingly, modeling is performed by an equivalent model formed by connecting the connecting part and sliding part with an elastic spring or the elastic spring and a viscoelastic member of a dashpot to grasp the dynamic behavior.

The driving parts of the reciprocating apparatus are treated as a rigid body performing in-plane translational motion; and for the connecting rod, piston rod and piston which possibly occur rotational motion on the structure, the rotational motion is taken into consideration by an equation of motion. Elastic springs are placed independently to each of the connecting parts in the horizontal and vertical directions which are directions of motion. Springs restraining up-and-down motion are placed to the sliding parts of the crosshead, intermediate ground part of the piston rod and rider ring of the piston, because they are places onto which each of parts is supported. On the basis of the assumptions described above, an equation of motion of many-body dynamics model is derived.

Sprig constants used to each of the connecting parts and sliding parts used for the equation of motion of the model are determined. For example, for spring in the cross direction (lateral or transverse direction) of the connecting rod or piston rod, equation of equivalent spring constant is used; for spring in the longitudinal direction (lengthwise direction) of the connecting rod or piston rod, equation of beam theory is used; for the sliding parts, general physical equations such as Heltz contact theory, etc. is used; thereby physical quantity is calculated. By inverse problems of a real machine and a virtual vibration data, the spring constant and viscous damping coefficient are derived as unknown parameters.

In the case of monitoring the quantity of states around the connecting rod, parts after the connecting rod, that is, the crosshead, piston rod, piston and cylinder are taken as single object, thereby performing the modeling. In the case of grasping the quantity of states of the connecting rod of the piston rod, modeling of 9(nine)-degree-of-freedom system is performed, taking the rotation of the intermediate supporting part of the piston rod or piston into no consideration. In the case of grasping the quantity of states of each of the parts with taking the rotation of the intermediate supporting part of the piston rod or piston into consideration, modeling of 11(eleven)-degree-of-freedom system is performed. The diagnostic system of this invention makes it possible to perform an optimum modeling according to the quantity of state to be monitored and is efficient diagnostic system.

When the adequacy of the modeling has been judged, unknown parameters (each spring constant or each spring constant and each viscous damping coefficient) are derived by an inverse problem analysis by the use of the data on normal operation of the reciprocating-type apparatus. Thus, the modeling is completed.

(C) Monitoring of the Reciprocating-Type Apparatus (an Internal Vibration Estimation Method):

For the model of the reciprocating-type apparatus, the quantity of states of connecting parts or sliding parts inside the apparatus can be grasped. However, in order to estimate the repeated load generated inside the reciprocating-type apparatus covered with a casing or fluctuation of acceleration of each of movable parts, the quantities of states of each of the movable parts (acceleration, speed (velocity), displacement, force, etc.) are calculated from information obtained by calculation of the external casing by the use of the transfer function making it possible to deduce Equation-ematically the relationship between an input signal and an output signal. In order to estimate the internal quantity of state from the external casing, internal vibration is identified by the use of an input identification method based on the inverse matrix or dynamic weighing method.

Next, the measurement (continuous monitoring, spot measurement) is carried out on operation of the reciprocating-type apparatus to obtain data. Parameter identification of the model with the equation of motion is performed by using the measured data to calculate the parameters of each of movable parts. Then, by comparing the parameters thus obtained with parameters of rigidity model, the quantity of state can be grasped from the change in rigidity.

Specifically, it has been known that natural frequency changes by the change of internal connecting state. Since the change of the natural frequency means that the spring constant and viscous damping coefficient of the connecting part also change (no change in weight), the quantity of state can be grasped from the variation of the spring constant and viscous damping coefficient, thereby making it possible to carry out the trend management.

From the data on the breakdowns which have been accumulated up to the present, any example in which the breakdown•deterioration of each of the movable parts has an influence on natural frequency is stored in a memory unit.

By grasping the change in states at the time of breakdown by the use of change of parameters by dynamic response analysis (numerical simulation) using accumulated data on breakdown and equation of motion of the model, the breakdowns of each of movable parts is estimated and the presence or absence of abnormality can be judged. Further, accurate quantity of state by internal vibration obtained by input identification can be grasped and lifetime prediction is also feasible from the material physical properties.

(D) According to this Invention, the Above-Described Problems are Solved Specifically in the Manner Described Below:

(1) A state monitoring system of a moving apparatus comprising:

a simulator comprising an equivalent model of said moving apparatus, which replaces vibrations caused by characteristics of one or plural constituent members to be monitored inside a casing of said moving apparatus and/or a connecting part between constituent members and/or a sliding part with vibrations caused by said characteristics of a viscoelastic member and which is able to output virtual vibration data having vibrations equivalent to synthesized vibrations of the viscoelastic member;

a parameter memory unit for storing the parameter of the spring constant or the spring constant and the viscous damping coefficient of said viscoelastic member, which is obtained by operating said simulator so that the waveform of said virtual vibration data output from said equivalent model of said simulator is made substantially to match the waveform of measured vibration data of the casing during normal operation of said moving apparatus, as parameter of said moving apparatus during normal operation;

a casing vibration measuring part for measuring the vibrations of said casing during actual operation of said moving apparatus at preliminarily-selected arbitrary one or plural sites of said casing;

a parameter identifying part in which by changing the parameters of said viscoelastic member, the waveforms of the virtual vibration data output from the equivalent model are made substantially to match the vibration waveforms obtained at the previously-selected arbitrary one or plural sites of the casing vibration measuring part during actual operation each other to identify the parameters of said viscoelastic member; and a parameter-change verifying part which verifies how said parameters during actual operation identified by said parameter-identifying part change in comparison with parameters of said moving apparatus during normal operation stored in said parameter-memory unit.

By virtue of such constitutions as described above, abnormalities of the moving apparatus and its cause of failures can be deduced by Equationematical analysis only by measuring the vibration of the casing. It is further possible to prevent breakdowns by lifetime prediction before they happen and to improve the reliability of the apparatus.

And further, internal states can be estimated only by measuring the vibration of the casing from the outside of the casing, as well.

It is, furthermore, possible to estimate the causes of breakdown by means of physical and Equationematical data without measured data or large scale and high expensive apparatus and to perform state-monitoring at low cost compared with a conventional state-monitoring apparatus of moving apparatus.

(2) A state monitoring system of a moving apparatus comprising:

a simulator comprising an equivalent model of the moving apparatus, which replaces vibrations caused by characteristics of one or plural constituent members as an monitored objects of the moving apparatus and/or a connecting part between said constituent members and/or a sliding part with vibrations caused by the characteristics of a viscoelastic member and which is able to output virtual vibration data equivalent to each of vibrations of said viscoelastic member replaced corresponding to each of vibrations of preliminarily-selected arbitrary plural monitored objects among said monitored objects, the vibration of which is measured during actual operation, or virtual vibration data on vibrations equivalent to synthesized vibrations of said viscoelastic member replaced corresponding to each of vibrations of preliminarily selected arbitrary plural monitored objects;

a parameter memory unit for storing the parameters of a spring constant or the spring constant and a viscous damping coefficient of said viscoelastic member which are obtained by operating said simulator so that the waveform of said virtual vibration data output from said equivalent model of said simulator is made substantially to match waveforms of each of measured vibration data of preliminarily selected arbitrary one or plural monitored objects during actual operation among said monitored objects during the operation of said moving apparatus, or a synthesized waveform of each of measured vibration data of said preliminarily-selected arbitrary plural monitored objects, as parameters of said moving apparatus during normal operation;

a monitored object vibration-measuring part for measuring the vibrations of said monitored object during actual operation of said moving apparatus;

a parameter-identifying part in which by operating said simulator by changing said parameters of said viscoelastic member, said waveform of said virtual vibration data output from said equivalent model is made to match substantially with a vibration waveform during actual operation obtained at said monitored object vibration measuring part or with a waveform of said synchronized vibrations to identify said parameters of said viscoelastic member; and, a parameter-change verifying part which verifies how said parameters during actual operation identified by said parameter-identifying part change in comparison with said parameters during normal operation of said moving apparatus stored in said parameter memory unit.

By virtue of such constitutions as described above, abnormalities of the moving apparatus and its cause of failures can be deduced by Equationematical analysis only by measuring the vibration of the monitored object. It is further possible to prevent breakdowns by lifetime prediction before they happen and to improve the reliability of the apparatus.

(3) In the above-described item (1) or (2), the viscoelastic member is an elastic spring. By virtue of such constitution, an equivalent model is simplified by using a spring constant of the elastic sprig as a parameter.

(4) In the above-described item (1) or (2), the viscoelastic member comprises an elastic spring and a dashpot.

By virtue of such constitution, it is possible to form the equivalent model that relaxes and absorbs vibrations of the elastic spring by the dashpot and to realize high-precision monitoring.

(5) In the above-described item (1) or (2), there is further provided with a parameter change-trend-judging part for judging the trend of change of one or plural constituent members to be monitored of the moving apparatus and/or connecting part between the constituent members and/or a sliding part, by means of changing states of the parameters during actual operation verified in the parameter-verifying part.

By virtue of such constitution, the trend of change of one or plural constituent members inside the moving apparatus and/or connecting part between the constituent members and/or the sliding part can be recognized; from the results, the lifetime of the moving apparatus can be found in early stage.

(6) In the above-described item (1) or (2), there is further provided with an abnormalities -judging part for judging an abnormal state of one or plural constituent members to be monitored of the moving apparatus and/or the connecting part between the constituent members and/or the sliding part, by comparing the variation of the parameters during actual operation verified in the parameter-change verifying part with threshold value previously set on the basis of the parameter at the normal operation.

By virtue of such constitution, the abnormal state of one or plural constituent members inside the moving apparatus and/or the connecting part between the constituent members and/or the sliding part can be recognized quickly by the abnormalities judging part.

(7) In the above-described item (1) or (2), the moving apparatus is provided with an electric motor, a crankshaft, a connecting rod, and a piston, and the equivalent model is provided with virtual rigid bodies of a crankshaft, a connecting rod, and a piston.

By virtue of such constitution, there is provided a specific state monitoring system of the moving apparatus specialized to the moving apparatus.

Advantageous Effects of Invention

According to this invention, abnormalities of the moving apparatus and its cause of failures can be deduced by Equationematical analysis only by measuring the vibration of the casing or the monitored object; it is further possible to provide a state monitoring system of the moving apparatus with no large-scaled and high expensive apparatus required.

BRIEF DESCRIPTION OF DRAWINGS

FIG. 3 Schematic illustration showing an example of an equivalent model of the moving apparatus.

FIG. 4 Table showing one example of correspondences between values of parameters of each of elastic springs at normal time and those at abnormal time, shown in FIG. 3.

FIG. 5 Flow chart showing procedures for preparing the equivalent model of the moving apparatus of the state-monitoring system of this invention.

FIG. 6 Flow chart showing procedures for monitoring the moving apparatus of the state -monitoring system of this invention.

DESCRIPTION OF EMBODIMENTS

A working embodiment of the state monitoring system of the moving apparatus of this invention will be described with reference to the accompanied drawings.

Figure 1:
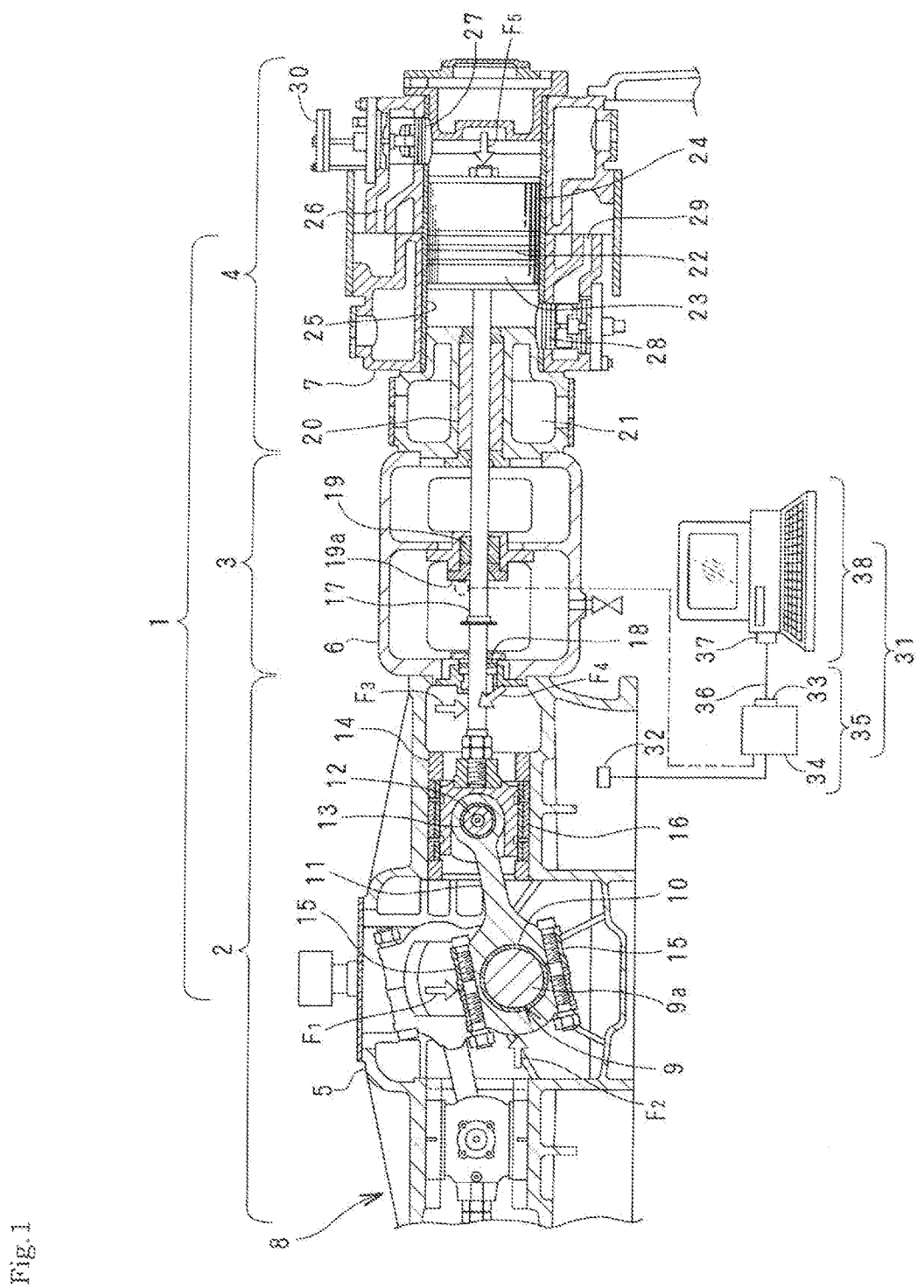
FIG. 1 Longitudinal sectional front view showing a working embodiment of the state monitoring system of this invention and one example of the moving apparatus to be monitored thereby.

As shown in FIG. 1, the moving apparatus 1 used for state-monitoring is a reciprocating-type compressor used for compression of hydrogen in a chemical plant.

The moving apparatus 1 comprises the crank part 2, the intermediate connecting part 3 and the piston-cylinder part 4; the crank case 5 of the crank part 2, the distance piece 6 of the intermediate connecting part 3, and the cylinder 7 of the piston-cylinder part 4 are integrated to form the casing 8.

The crank part 2 is pivotally supported to the nearly center of the crank case 5 rotatably in the longitudinal direction. In two eccentric parts the lengthwise positions of which are shifted and which are in a phase difference of 180 degrees respectively; the crank part 2 comprises the crank shaft 9 having two crank pins 9a (either shown in FIG. 1), its base being rotatably fitted onto each of the two crank pins 9a through the crank pin metal 10; the left-and-right pair of connecting rods 11 the ends of which are elongated outwardly in the right and left direction respectively; and the crosshead 14 which is rotatably connected to the ends of each of the connecting rod 11 by the crosshead pin 12 and the crosshead pin metal 13 in the front-back direction and which slides in the right and left direction in the crank case 5.

The crank part 2 is nearly left-right symmetrical structure centered with respect to the crankshaft 9, to left and side outsides of which the intermediate connecting part 3 and the piston-cylinder part 4 are connected, respectively. However, a description is given below only to right side structures from the crankshaft 9 for easy understanding.

The base part of the connecting rod 11 is divided into two parts which are attached to the crank pin 9a by connecting the two parts by the bolts 15.

The crosshead shoe 16 is attached to the outer periphery of the crosshead 13 so as to decrease the sliding friction by the crank case 5.

In the crank part 2, the crankshaft 9 is rotated by an electric motor (not shown in FIGS.) placed outside the crank case 5; thereby the crosshead 14 is forced to make linear reciprocating in the left-right direction via the connecting rod 11.

The left end of the piston rod 17 is connected to the crosshead 14; the piston rod 17 is toward in the left-right direction and penetrates through the distance piece 6 of the intermediate 3 and leads to the inside of the cylinder 7 of the piston cylinder part 4.

The oil power ring 18 is placed in the penetration of the piston rod 17 which is the boundary of the crank case 5 and the distance piece 6, and the intermediate gland packing 19 is placed in the penetration of the piston rod 17 which is the intermediate part of the distance piece 6.

The gland packing 20 is placed in the penetration of the piston rod 17 which is the connecting part of the distance piece 6 in the cylinder 7 of the piston-cylinder part 4. Many cooling agent-passageways 21 are placed to the cylinder 7, by the cooling agent passing through which the cylinder 7 is adapted to be cooled.

The piston 24 is connected to the right end of the piston rod 17 penetrating into the cylinder 7. The piston cylinder 22 and the rider ring 23 are attached to the outer peripheral face of the piston 24. The piston 24 reciprocates in the right-left direction inside the cylinder liner 25 placed to the inner face of the cylinder 7. Thereby, gas introduced through the suction valve 27 from the gas inlet 26 is compressed and is discharged from the gas outlet 29 through the discharge valve 28.

The suction valve open-type unloader 30 is connected to the suction valve 27.

The structures of the moving apparatus 1 for states monitoring are outlined above. For such a moving apparatus 1 described above, vibrations are generated from the sliding parts and/or rotating parts, for example, the bearing part of the crankshaft 9 of the crank case 5; the rotating part between the crank pin 9a and the crank pin metal 10; the rotating part between the crosshead pin 12 and the crosshead pin metal 13; the sliding part between the crosshead shoe 16 and the crank case 5; the sliding parts between the oil power ring 18, the intermediate grand packing 19 and the grand packing 20 and the piston rod 17; the sliding parts between the outer peripheral face of the piston 24, the piston cylinder 22 and the rider ring 23 and the cylinder liner 25, etc.

According to this invention, with respect to such a moving apparatus 1 as described above, the transfer constant of the quantity of state generated in a site of the moving apparatus is calculated by experimental mode analysis in order to grasp the characteristics of amplitude or phase having influences to the outer casing, an input (force) identification is performed, and parameter diagnosis by numerical simulation from multibody dynamics analysis and characteristic value and change in frequency characteristics are performed to measure an external casing, thereby making it possible to perform analytical modeling for grasping the internal states of a moving apparatus.

The state monitoring system 31 is placed to a part of the casing 8 of the moving apparatus 1, that is, to the lower part of the crank case 5 in FIG. 1 and comprises the vibration sensor 32 for measuring the vibration of the casing 8, the casing vibration measuring part 35 comprising the vibration measuring unit 34 converting the output from the vibration sensor 32 to data transmittable from the output interface 33 such as RS232 etc. and the input interface 33 connected with the output interface 33 of the vibration measuring unit 34 through the cable 36; and is also provided with the PC (personal computer) 38 into which a multi body dynamics analyzing application, an FFT analyzer and another applications required are built.

Figure 2:
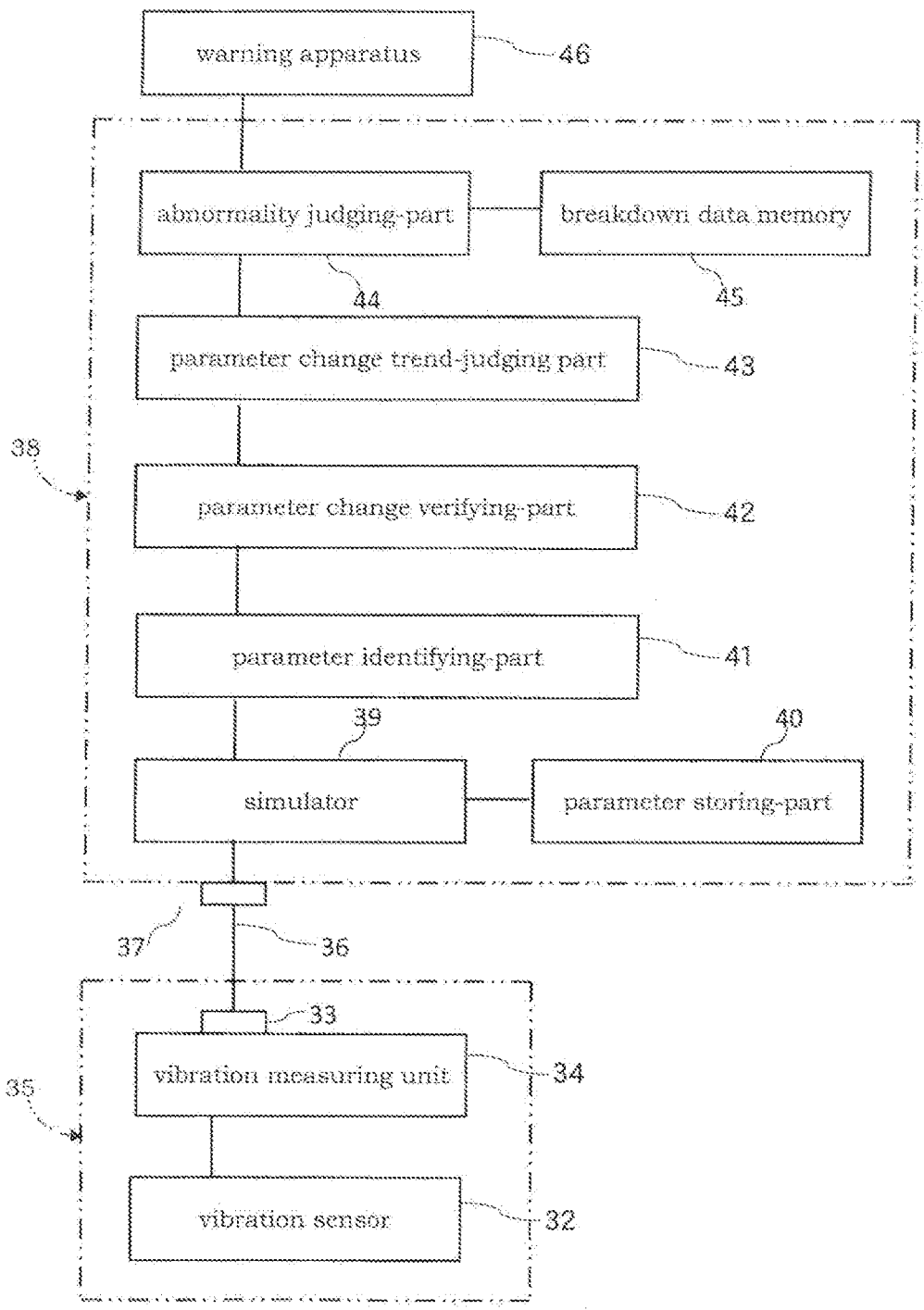
FIG. 2 Brock diagram of a working embodiment of the state monitoring system of this invention.

The functions inside the PC 38 and the casing vibration measuring part 35 are shown in FIG. 2 by a block diagram. As shown in FIG. 2, the state monitoring system 31 comprises the casing vibration measuring part 35 and PC 38, and the casing vibration measuring part 35 comprises the vibration sensor 32 and the vibration measuring unit 34.

The PC 38 comprises; the simulator 39 comprising an equivalent model of the moving apparatus 1, which replaces the vibrations of one or plural constituent members to be monitored inside the casing 8 of the moving apparatus and/or connecting parts between the constituent members to vibrations of an elastic spring, and which is apt to output virtual vibration data having vibrations equivalent to synthesized vibrations of those of the elastic spring; the parameter memory unit 40 for storing the parameter of the spring constant of the elastic spring as parameter of the moving apparatus 1 during normal operation, which is obtained by operating the simulator 39 so as to match substantially the waveform of the virtual vibration data output from the equivalent model of the simulator 39 with the waveform of the measured vibration data of the casing during normal operation of the moving apparatus; the parameter identifying part 41 in which the waveform of the virtual vibration data output from the equivalent model is made to match the waveform of the virtual vibration during actual operation obtained from the casing vibration measuring part 35 by operating the simulator 39 by changing the parameter of the elastic spring to identify the parameter of the elastic spring; and the parameter change verifying part 42 in which how the parameters during actual operation identified by the parameter identifying part 41 change in comparison with the parameters during normal operation of the moving apparatus stored in the parameter memory unit 40.

Further, the PC 38 comprises; the parameter change-trend-judging part 43 for judging the change-trend of one or plural constituent members inside the moving apparatus 1 and/or connecting parts between the constituent members and the sliding part from the changing states of parameters during actual operation verified by the parameter-change-verifying part 42; the abnormality judging part 44 for judging the abnormality of one or plural constituent members inside the moving apparatus 1 and/or connecting parts between the constituent members and the sliding part by comparing the quantity of change of parameters during actual operation verified in the parameter-change verifying part 42 with the threshold previously set on the basis of the parameters during normal operation; and the breakdown data memory 45 for stocking examples as vibration patterns at the abnormal tine, in which the breakdown•degradation of each of the movable parts affect the natural frequency with reference to the data on breakdown which have been accumulated up to the present.

More specifically, the simulator 39 regards one or plural constituent members inside the casing 8 of the moving apparatus 1 to be monitored and/or connecting parts between the constituent members, that is, the crankshaft 9, connecting rod 11, crosshead 14, piston rod 17 and piston 24 as virtual rigid bodies and assumes that each of them is connected each other by an elastic spring S-a viscoelastic member, and simultaneously they are connected with the casing 8 by an elastic spring S-a viscoelastic member, and forms on the PC 38 the equivalent model of the moving apparatus 1 as shown in FIG. 3.

In FIG. 3, the same symbols as those in FIG. 1 show the same virtual rigid bodies as those in FIG. 1.

One example of each of values at normal time (initial state) of the parameters of each of the elastic springs S and those at abnormal time is shown in FIG. 4.

Next, preparation of the equivalent model of the moving apparatus 1, that is, modeling is described with reference to the flowchart shown in FIG. 5.

First, as selection (S1) of an object apparatus, the moving apparatus 1 was selected, and the crankshaft 9, connecting rod 11, crosshead 14, piston rod 17 and piston 24 which are movable parts of the moving apparatus 1 are regarded as virtual rigid bodies and each of them is connected each other by an elastic spring S-a viscoelastic member, and simultaneously they are connected with the casing 8 by an elastic spring S-a viscoelastic member.

In the modeling, for respect to the connecting rod 11, piston rod 17 and piston 24 which possibly generate rotational motions, such rotational motions are taken into consideration by motion equation. Each of elastic springs is placed independently to each of the connecting parts in the horizontal and vertical direction that are directions of motions.

Since the sliding part of the crosshead 14, the intermediate grand part of the piston rod 17, and the rider ring of the piston 24 are places to which each of parts is supported, springs restraining the vertical motions are placed thereto. The above-described connecting parts and sliding parts are taken as the places for observation and the places of drawback. (S2)

On the basis of the above-described assumption, motion equation of multibody dynamics model can be derived. (S3).

In the simulator 39, the parameter memory unit 40 and the parameter identifying part 41, inverse problems (parameter identification) using least squares method, downhill simplex method, etc. are resolved by the use of the equivalent model of the moving apparatus 1 and by the use of frequency response data from the casing 8 measured by the casing vibration measuring part 35, thereby calculating parameters of the spring constant of each of the connecting parts (parameter identification) and then inside states are estimated by the change of the parameters by external measuring. (S4).

The spring constants used in each of the connecting parts used by the motion equation of the equivalent model and used in the sliding parts are determined. General physical equations are used to calculate the physical quantities; for example, the equation of the equivalent spring constant is used for the spring in the lateral direction of the connecting rod 11 or the piston rod 17, the beam equation is used for the spring in the longitudinal direction thereof, and Heltz contact theory is used for the sliding parts, etc. to calculate the physical quantities.

In order to confirm the adequacy of the equivalent model, the natural vibration characteristics (characteristics of the moving apparatus 1) are verified from the results of the analysis of the characteristic value performed on the basis of the motion equation and characteristic frequency of the moving apparatus 1(S5).

When the equivalent model (motion equation) does not match the characteristic frequency of the moving apparatus, reexamination of the model is carried out to from an equivalent model the characteristic frequency of which matches each other.

For example, when monitoring the quantity of state of the connecting part around the connecting rod 11, parts after the connecting rod 11 are regarded as one body (object) to perform modeling. When grasping the quantity of state of the connecting part of the piston rod 17, 9 (nine)-degree-of-freedom system modeling is performed without taking the intermediate supporting part of the piston rod 17, the rotation of the piston 24, etc. into consideration. When grasping the quantities of states of each of the parts, taking the intermediate supporting part of the piston rod 17, the rotation of the piston 24, etc. into consideration, 11 (eleven)-degree-of-freedom system modeling is performed. In such manner as described above, the optimum modeling must be performed depending on the quantity of states to be monitored.

When the adequacy of the equivalent model has been judged, unknown parameter (each spring constant) is derived from inverse problems by the use of the data in operation of the moving apparatus using parameter identification (system identification), which is then stored in the parameter memory unit 40 (S6).

The monitoring of the moving apparatus 1 is carried out in such a manner as described below as shown in the flowchart of FIG. 6: For the equivalent model of the moving apparatus 1, the quantities of states of the connecting parts or sliding part inside the equivalent model of the moving apparatus 1 can be grasped. However, However, in order to estimate the repeated load or fluctuation of acceleration of each of the movable parts which is generated inside the moving apparatus 1 covered with the casing 8, the quantities of states of each of the movable parts of the inside (acceleration, speed, displacement, force, etc.) are calculated from the information measured from the casing 8 by the use of a transfer function capable of obtaining Equationematically the relationship between an input signal and output signal. In order to obtain the quantities of states of the inside from the casing 8, the frequency response function measurement is carried out to derive coefficients for each of frequencies as results of calculation (S8).

Measurements (continuous monitoring, spot measurement) are carried out in operation of the moving apparatus 1 (S9) to obtain data. By the use of the data thus obtained, parameter identification with the equation of motion of the equivalent model is performed in such a manner as described above (S10), the parameters of each of the movable parts are calculated; the parameters thus obtained are compared with the parameters of the equivalent model in the parameter change verifying part 42, thereby making it possible to grasp the quantities of states from the change of rigidity.

Specifically, it has been known that the natural frequency changes by the change of connecting states inside the moving apparatus. The change of the natural frequency means that the spring constant of the connecting parts without change of weight. By grasping the quantity of state from the changing quantity of the spring constant, trend-managing is performed in the parameter-change-trend judging parts 43.

On the basis of the data on breakdown which have been accumulated up to the present, an example in which the breakdown/degradation of each movable part affecting the natural frequency is stored in the breakdown data memory 45 as a frequency pattern of abnormality.

In the abnormality judging part 44, breakdowns of each of movable parts are estimated by grasping the breakdown data accumulated in the breakdown data memory 45 and the change of the state during breakdown by the change of the parameters by the dynamic response analysis (numerical simulation) using the equation of motion of the equivalent model to judge the presence or absence of the abnormality; when the judgment is YES (the presence of the abnormality), the warning apparatus 46 such as a buzzer, warning ramp, etc. is operated (S11).

It is, further, possible to confirm the adequacy of the equivalent model by verifying the characteristic frequency from the results of the characteristic value analysis performed by the equation of motion and the natural frequency of the moving apparatus 1 (S12).

By applying the coefficient obtained from the transfer function to the measure data, the precise quantity of state can be obtained, or lifetime can be predicted from physical properties of material, or a repair plan can be arranged (S13).

Figure 7:
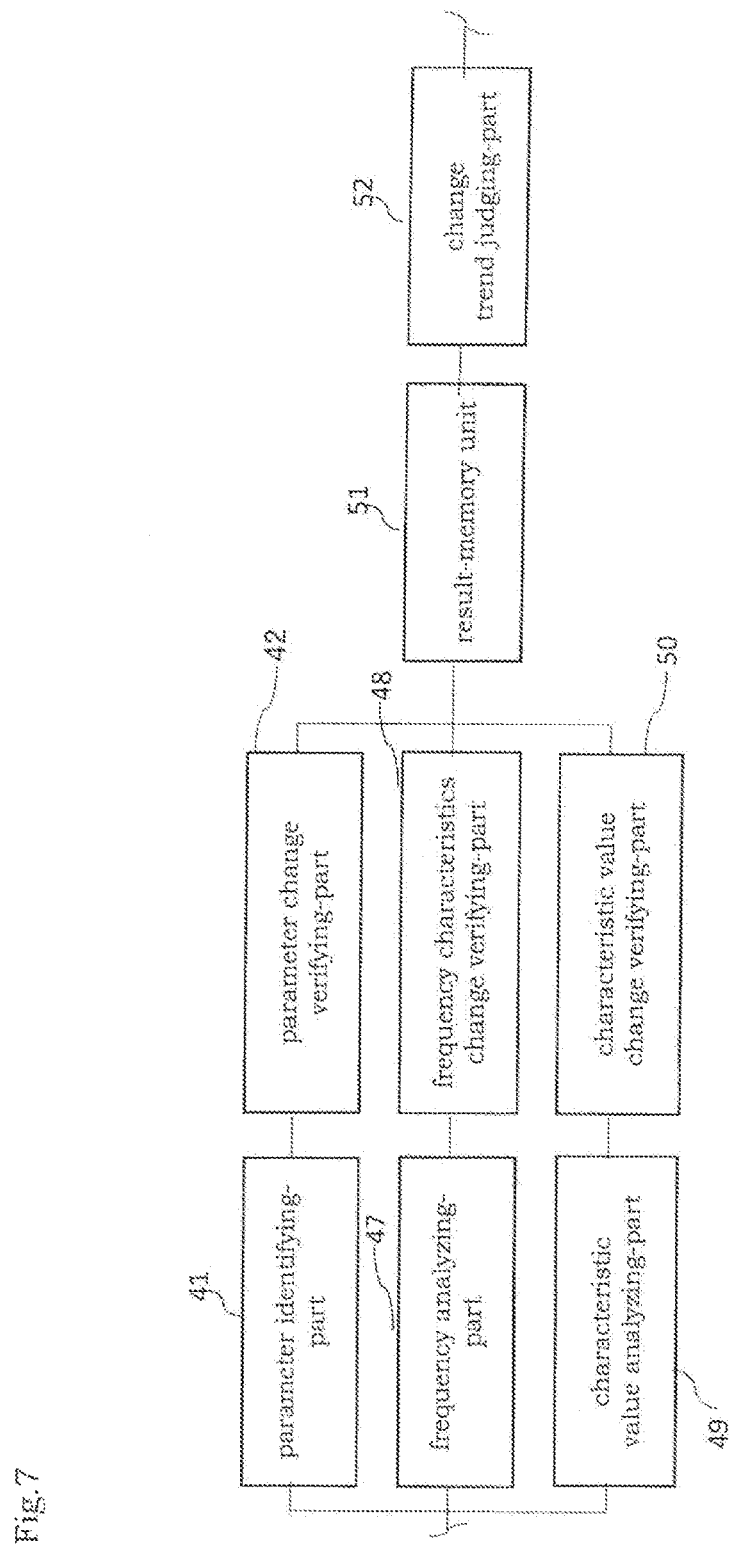
FIG. 7 Block diagram showing variations of parts from the parameter identifying part to the parameter change-trend-judging part, shown in FIG. 2.

FIG. 7 shows a variation of parts from the parameter identifying part 41 to the parameter-change-trend judging part 43 shown in FIG. 2.

As shown in FIG. 7, the frequency-analysis part 47-and-the frequency -characteristics-change-verifying part 48 and the characteristic value-analysis part 49 -and-the characteristic value-change-verifying part 50 may be placed in parallel to the parameter-identifying part 41 and the parameter-change-verifying part 42; the verified data of each of the parameter-change-verifying part 42 and the frequency -characteristics-change-verifying part 48 and the characteristic value-change-verifying part 50 are stored in the results-memory unit 51, and then such change trends may be judged in the change-trend-judging part 52 including the parameter-change-trend -judging part 43 shown in FIG. 2.

Only an elastic spring S was used as a viscoelastic member in the descriptions described above. However, the above-described all elastic spring S may be placed in parallel to the dashpot D to constitute a viscoelastic member comprising the elastic spring S and the dashpot D as shown in FIG. 8.

Figure 8:
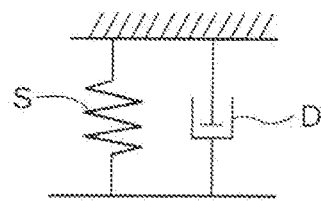
FIG. 8 Schematic illustration showing a variation in which the viscoelastic member is formed from the elastic spring and the dashpot.

Constituting the viscoelastic member comprising the elastic spring S and the dashpot D as shown in FIG. 8.

By composing the viscoelastic member of the elastic spring S and the dashpot D, an equivalent model can be formed for relaxing-absorbing the vibration of the elastic spring S by the dashpot S, thereby realizing the monitoring of more high precision.

Next, a specific case of breakdown is described:

This is a case in which since number of vibration increased while operating the reciprocating apparatus 1, a simulation at the time of simulated breakage was carried out to judge that the lowering of the constants of the elastic spring around the connecting parts of the connecting rod 11 and the crosshead 14 has an abnormality.

Figure 9:
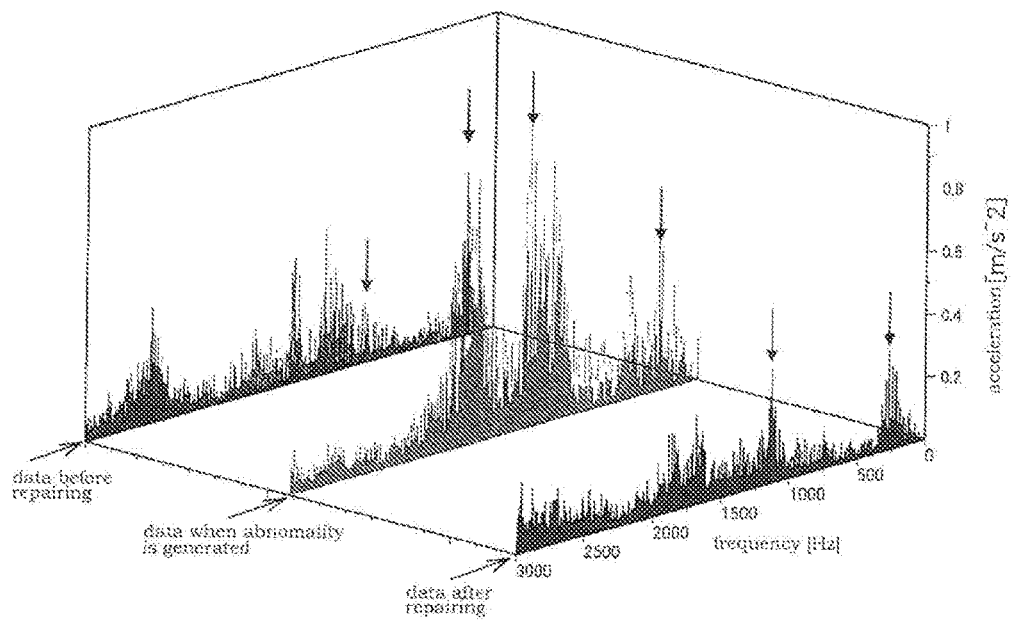
FIG. 9 Schematic illustration showing results of analysis of frequency before and after repairing and at the time of abnormality occurrence in measurement by a real machine in an example of breakdown.
Figure 10:
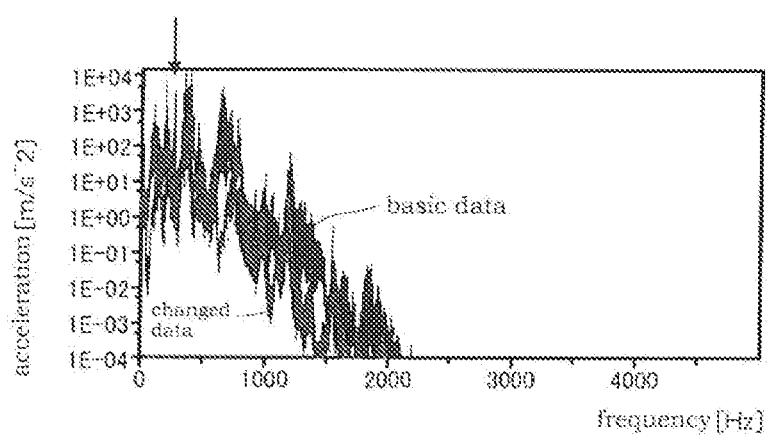
FIG. 10 Schematic illustration showing results of simulations in an example of breakdown.

FIG. 9 shows the results of the analyses of number of frequency during the measurement of a real machine before and after repair and during breakage. FIG. 10 shows the results of simulation that simulates the time before-repair and the time of breakage. Since the data on the number of frequency during breakage changes relative to the data on the number of frequency before repair, it is predicted that changes are generated in a model parameter, thereby making it possible to estimate the site of breakage or degree of lowering of the spring constant by identification of parameter.

The cause of the breakdown in this case was the looseness of a cover bolt (drawing omitted) because of falling of the gland nut (drawing omitted) from the cover bolt (drawing omitted) of the crosshead pin cover (drawing omitted) placed to both ends of the crosshead pin 12.

From the facts that the spring constants of the connecting rod and crosshead-connecting part and, that of the crosshead sliding part lowered by around one-tenth (1/10) as a model parameter-change describing the changes from the data before repair to that when abnormality occurred shown in FIG. 8, it was inferred that there was a breakage in the connecting part of the connecting rod 11 and the crosshead 14. These data were stored in the breakdown data memory 45 on demand.

Next, Equationemathematical analyses are described:

[Formularization of Model]

In FIG. 3, the center (0) of the crankshaft 9 is fixed to the coordinate (0, 0). Positions (x0, y0) of the crankshaft 9 are described as shown in equations (4.1) and (4.2):

$$x_0 = r \cos \omega t \quad \text{[Equation 1]}$$

$$y_0 = r \sin \omega t \quad \text{[Equation 2]}$$

Motion equations of the connecting rod 11 are described in equations (3), (4) and (5). Herein, mc and lc are weight and length of the connecting rod 11, respectively, φ is a minute rotation angle around the center of gravity of the connecting rod 11 and lc is length of the position of the center of gravity of the connecting rod 11. Further the inertia moment acting on the connecting rod 11 is lc. And, kxc and kyc are elastic spring S placed to the connecting part between the crankshaft 9 and the connecting rod 11, respectively. Further, kxch and kych are elastic spring S placed to the connecting part between the connecting rod 11 and the crosshead 14. Equations (6) and (7) express the force acting on the connecting rod 11, respectively.

$$m_c \ddot{x}_c = -k_{xc}\{x_c - l_{cg}\cos\varphi - x_0\} + \\ k_{xch}\left\{\left(x_{ch} - \frac{l_{ch}}{2}\right) - x_c - (l_c - l_{ch})\cos\varphi\right\} \quad \text{[Equation 3]}$$

$$m_c \ddot{y}_c = -k_{yc}\{y_c - l_{cg}\sin\varphi - y_0\} + k_{ych}\{y_{ch} - y_c - (l_c - l_{ch})\sin\varphi\} \quad \text{[Equation 4]}$$

$$I_c\ddot{\varphi} = -(l_c - l_{cg})\sin\varphi \cdot f_{x2} + (l_c - l_{cg})\cos\varphi \cdot f_{y2} - l_{cg}\sin\varphi \cdot f_{x1} - l_{cg}\cos\varphi \cdot f_{y1} \quad \text{[Equation 5]}$$

$$f_{y1} = k_{yc}\{y_c - l_{cg}\sin\varphi - y_0\} \quad \text{[Equation 6]}$$

$$f_{y1} = k_{yc}\{y_c - l_{cg}\sin\varphi - y_0\} \quad \text{[Equation 7]}$$

The motion equations of the crosshead 14 are described in equatic, nd (9), respectively. Herein, mch and lch are weight and length of the crosshead 14, respectively. Ic and φ are length of the connecting rod 11 and a minute rotation angle around the center of gravity of the connecting rod 11, respectively. Ipl and ξ are length of the piston rod 17 and a minute rotation angle around the center of gravity of the piston rod 17, respectively. And, kxch and kych are elastic spring S placed to the connecting part between the connecting rod 11 and the crosshead 14, respectively. Further, kxpl and kypl are elastic spring S placed to the connecting part between the crosshead 14 and the piston rod 17, respectively. Equations (10) and (11) express the force acting on the connecting rod 11, respectively. The spring support in the vertical direction of the crosshead sliding part is indicated by kzch. The vertical external force acting on the crosshead 14 is indicated by fzl as shown in equation (2).

$$m_{ch}\ddot{x}_{ch} = -k_{xch}\left\{\left(x_{ch} - \frac{l_{ch}}{2}\right) - x_c - (l_c - l_{ch})\cos\varphi\right\} + \\ k_{xpl}\left\{x_{pl} - \frac{l_{pl}}{2}\cos\xi - \left(x_{ch} + \frac{l_{ch}}{2}\right)\right\} \quad \text{[Equation 8]}$$

$$m_{ch}\ddot{y}_{ch} = -k_{ych}\{y_{ch} - y_c - (l_c - l_{ch})\sin\varphi\} + \\ k_{ypl}\left(y_{pl} - \frac{l_{pl}}{2}\sin\xi - y_{ch}\right) - k_{zch}y_{ch} \quad \text{[Equation 9]}$$

$$f_{x2} = k_{xch}\left\{\left(x_{ch} - \frac{l_{ch}}{2}\right) - x_c - (l_c - l_{ch})\cos\varphi\right\} \quad \text{[Equation 10]}$$

$$f_{y2} = k_{ych}\{y_{ch} - y_c - (l_c - l_{ch})\sin\varphi\} \quad \text{[Equation 11]}$$

$$f_{z1} = k_{zch}y_{ch} \quad \text{[Equation 12]}$$

The motion equations of the piston rod 17 are described in equations (13), (14) and (15), respectively. Herein, mpl and lpl are weight and length of the piston rod 17, respectively; ξ is a minute rotation angle around the center of gravity of the piston rod 17; and the moment of inertia acting to the piston rod 17 is lpl. Further, kxlp and kypl are elastic spring S placed to the connecting part between the piston rod 17 and the piston 24, respectively. Equations (16) and (17) express the force acting on the piston rod 17. The spring supports against three vertical external forces of the intermediate gland supporting part of the piston rod 17 are input as kzbpl, kzpl and kzcpl, respectively. With the motion of the piston rod 17, the positions of the spring supports move every one hour. The vertical external forces fz2, fz3 and fz4 acting on the piston rod 17 are described in equations (18), (19) and (20), respectively.

$$m_{pl}\ddot{x}_{pl} = -k_{xpl}\left\{x_{pl} - \frac{l_{pl}}{2}\cos\xi - \left(x_{ch} + \frac{l_{ch}}{2}\right)\right\} + k_{xp}\left(x_p - \frac{l_p}{2}\cos\zeta - x_{pl} - \frac{l_{pl}}{2}\cos\xi\right)$$ [Equation 13]

$$m_{pl}\ddot{y}_{pl} = -k_{ypl}\left(y_{pl} - \frac{l_{pl}}{2}\sin\xi - y_{ch}\right) + k_{yp}\left(y_p - \frac{l_p}{2}\sin\zeta - y_{pl} - \frac{l_{pl}}{2}\sin\xi\right) - f_{z2} - f_{z3} - f_{z4}$$ [Equation 14]

$$l_{pl}\ddot{\xi} = -\frac{l_{pl}}{2}\sin\xi\left[k_{xpl}\left\{x_{pl} - \frac{l_{pl}}{2}\cos\xi - \left(x_{ch} + \frac{l_{ch}}{2}\right)\right\}\right] + \frac{l_{pl}}{2}\cos\xi\left\{k_{ypl}\left(y_{pl} - \frac{l_{pl}}{2}\sin\xi - y_{ch}\right)\right\} - \frac{l_{pl}}{2}\sin\xi\left\{k_{xp}\left(x_p - \frac{l_p}{2}\cos\zeta - x_{pl} - \frac{l_{pl}}{2}\cos\xi\right)\right\} + \frac{l_{pl}}{2}\cos\xi\left\{k_{yp}\left(y_p - \frac{l_p}{2}\sin\zeta - y_{pl} - \frac{l_{pl}}{2}\sin\xi\right)\right\} + (x_{pl} - x_{zbplt=0})\cos\xi \cdot f_{z2} + (x_{pl} - x_{zplt=0})\cos\xi \cdot f_{z3} + (x_{pl} - x_{zcplt=0})\cos\xi \cdot f_{z4}$$ [Equation 15]

$$f_{x3} = k_{xpl}\left\{x_{pl} - \frac{l_{pl}}{2}\cos\xi - \left(x_{ch} + \frac{l_{ch}}{2}\right)\right\}$$ [Equation 16]

$$f_{y3} = k_{ypl}\left(y_{pl} - \frac{l_{pl}}{2}\sin\xi - y_{ch}\right)$$ [Equation 17]

$$f_{z2} = k_{zbpl}\{y_{pl} - (x_{pl} - x_{zbpl\,t=0})\sin\xi\}$$ [Equation 18]

$$f_{z3} = k_{zpl}\{y_{pl} - (x_{pl} - x_{zpl\,t=0})\sin\xi\}$$ [Equation 19]

$$f_{z4} = k_{zcpl}\{y_{pl} - (x_{pl} - x_{zcpl\,t=0})\sin\xi\}$$ [Equation 20]

The motion equations of the piston 24 are described in equations (21), (22) and (23), respectively. Herein, mp and 1p are weight and length of the piston 24, respectively; the inertia moment acting on the piston 24 is indicated by lp. kxp and kyp are the elastic spring S placed to the connecting part between the piston rod 17 and the piston 24, respectively. Equations (24) and (25) express the force acting on the piston 24 as shown in FIG. 3, respectively. The spring supports against two vertical external forces of two points of the sliding part of the rider ring which is a supporting point of the piston 24 are input as kzbp and kzcp, respectively. With the motion of the piston 24, the positions of the spring supports move every one hour. The vertical external forces fz5 and fz6 acting on the piston 24 are described in equations (26) and (27), respectively.

$$m_p\ddot{x}_p = -k_{xp}\left\{x_p - \frac{l_p}{2}\cos\zeta - x_{pl} - \frac{l_{pl}}{2}\cos\xi\right\}$$ [Equation 21]

$$m_{pl}\ddot{y}_{pl} = -k_{yp}\left(y_p - \frac{l_p}{2}\sin\zeta - y_{pl} - \frac{l_{pl}}{2}\sin\xi\right) - f_{z5} - f_{z6}$$ [Equation 22]

$$l_{pl}\ddot{\xi} = -\frac{l_p}{2}\sin\zeta\left\{k_{xp}\left(x_p - \frac{l_p}{2}\cos\zeta - x_{pl} - \frac{l_{pl}}{2}\cos\xi\right)\right\} + \frac{l_p}{2}\cos\zeta\left\{k_{yp}\left(y_p - \frac{l_p}{2}\sin\zeta - y_{pl} - \frac{l_{pl}}{2}\sin\xi\right)\right\} + (x_p - x_{zbpt=0})\cos\zeta \cdot f_{z5} + (x_{zcpt=0} - x_p)\cos\zeta \cdot f_{z6}$$ [Equation 23]

$$f_{x4} = k_{xp}\left(x_p - \frac{l_p}{2}\cos\zeta - x_{pl} - \frac{l_{pl}}{2}\cos\xi\right)$$ [Equation 24]

$$f_{y4} = k_{yp}\left(y_p - \frac{l_p}{2}\sin\zeta - y_{pl} - \frac{l_{pl}}{2}\sin\xi\right)$$ [Equation 25]

$$f_{z5} = k_{zbp}\{y_{pl} - (x_p - x_{zbp\,t=0})\sin\xi\}$$ [Equation 26]

$$f_{z6} = k_{zcp}\{y_{pl} + (x_{zcp\,t=0} - x_p)\sin\xi\}$$ [Equation 27]

[Response Calculation by Runge-Kutta Methods]

Rotational input frequency [f] of the reciprocating-type compressor is taken as 8 [Hz] and acceleration response at the center of gravity is calculated below. Angular frequency [ω] is given by the following equation by the relationship between f (frequency), T (period) and ω (angular frequency):

$$\omega = 2\pi f [rad/sec]$$ Equation [28]

This is input per unit time. When the magnitude of input amplitude caused by the crankshaft 9 of the reciprocating compressor and radius of the crankshaft 9 are taken as x0 and y0, and r[m] respectively, the x0 and y0 are given by equations (1) and (2), respectively. The above-described response calculations are not restricted when it uses numerical integration; any public known method such as Euler's method etc. is adopted.

[Internal Vibration Input-Identification Method in Operation]

As a technique of analyzing the contribution of from a vibration source as internal vibration during operation to the response as extraneous vibration (measuring point), a transfer path analysis (hereinafter, referred to as "TPA") has been adopted. It is nearly impossible to measure the transfer function in the TPA during operation; when a direct measurement is not possible in such as case, it is necessary to input and identify the vibration source in operation as an inverse problem. As an input-identification method an inverse matrix method or dynamic spring method has been widely adopted as an input identification method. For example, a case using the inverse matrix method is described below. By performing the TPA using the inverse matrix method, an input-identification is performed on the basis of accelerance estimated by a vibration test and an acceleration value (response value) obtained during operation. When performing input-identification by the inverse matrix method, Frequency Response Function (hereinafter, referred to as "FRF") by H1 Estimation Chapter is used.

[Inverse Matrix Method]

For a transfer function inverse matrix method, it is necessary to increase a response point in order to improve the identification precision and to perform calculation using pseudo inverse matrix, in a case of a complicated model (mechanism). First, it is necessary to obtain accelerance, as a preliminary step prior to input-identification. In the proposal diagnosis system, an internal vibration (input) is identified from extraneous vibration (response), and parameter analysis by a Equationematical model is performed using such an estimated input value. Taking the convenience of measurement into consideration, one measuring point is ideal for a cylinder; it is, therefore, necessary to estimate FRF between two input-output points of each of parts on the basis of response point as extraneous vibration. FRF was estimated for the combination of plural input signals and output signals in a case of five vibration-application points (F1~F5). Derivation of FRF estimation and that of input-identification are described below.

The relationship in the frequency domain of input-output between two points of the crank-piston mechanism is shown in the following equation when FRF matrix, input FRF matrix and output FRF matrix are taken as [Hn, n], [Xn, m] and [Yn, m], respectively:

$$[Y]=[H][X] \qquad \text{[Equation 29]}$$

Herein, [H] is derived as described below using generalized inverse matrix:

$$[H]=[Y]([X]^T)([X][X]^T)^{-1} \qquad \text{[Equation 30]}$$

In case of performing input-identification, when derived transfer function is taken as [Hn, n], internal vibration during operation is taken as input signal [Xn, m] and extraneous vibration is taken as output signal [Yn, m], the following relationship holds between them $$\begin{bmatrix} X_{1,1} & \cdots & X_{1,m} \\ \vdots & \ddots & \vdots \\ X_{n,1} & \cdots & X_{n,m} \end{bmatrix} = \begin{bmatrix} H_{1,1} & \cdots & H_{1,m} \\ \vdots & \ddots & \vdots \\ H_{n,1} & \cdots & H_{n,m} \end{bmatrix}^{-1} \begin{bmatrix} Y_{1,1} & \cdots & Y_{1,m} \\ \vdots & \ddots & \vdots \\ Y_{n,1} & \cdots & Y_{n,m} \end{bmatrix} \qquad \text{[Equation 31]}$$

[Estimation of FRF Using a Miniature Experimental Apparatus]

FRF is estimated by using a miniature experimental apparatus. The measuring point of extraneous vibration was taken as reference. Measurements are performed between input-output two points of the exterior (casing) and the interior (every parts) for every parts corresponding to the Equationematical model formed. With respect to vibration-application points, five points of F1~F5, that is, crank-vertical direction (F1), crank-axial direction (F2), piston-vertical direction (F3), piston-horizontal direction (F4) and piston-axial direction (F5) were adopted. FRF is estimated for such a case as described above. The above-described vibration-application points F1~F5 are shown in FIG. 1.

Process of derivation of FRF matrix [H] under the above-described states is described below. Herein, results obtained under the state that an acceleration sensor is placed to piston rod (internal input)—casing (extraneous output) are shown.

A casing is taken as an output signal Zk (1) and a piston rod is taken as an input signal Zk (2). Substituting vibration-application points F1~F5 for equation (29), the following equation holds. K=x, y, z (direction of acceleration sensor).

$$[Y] = [H][X] \qquad \text{[Equation 32]}$$

$$\begin{bmatrix} \frac{Z_x(1)}{F_1} & \frac{Z_x(1)}{F_2} & \frac{Z_x(1)}{F_3} & \frac{Z_x(1)}{F_4} & \frac{Z_x(1)}{F_5} \\ \frac{Z_y(1)}{F_1} & \frac{Z_y(1)}{F_2} & \frac{Z_y(1)}{F_3} & \frac{Z_y(1)}{F_4} & \frac{Z_y(1)}{F_5} \\ \frac{Z_z(1)}{F_1} & \frac{Z_z(1)}{F_2} & \frac{Z_z(1)}{F_3} & \frac{Z_z(1)}{F_4} & \frac{Z_z(1)}{F_5} \end{bmatrix} =$$

$$\begin{bmatrix} \frac{Z_{xx}}{FF} & \frac{Z_{xy}}{FF} & \frac{Z_{xz}}{FF} \\ \frac{Z_{yx}}{FF} & \frac{Z_{yy}}{FF} & \frac{Z_{yz}}{FF} \\ \frac{Z_{zx}}{FF} & \frac{Z_{zy}}{FF} & \frac{Z_{zz}}{FF} \end{bmatrix}$$

$$\begin{bmatrix} \frac{Z_x(2)}{F_1} & \frac{Z_x(2)}{F_2} & \frac{Z_x(2)}{F_3} & \frac{Z_x(2)}{F_4} & \frac{Z_x(2)}{F_5} \\ \frac{Z_y(2)}{F_1} & \frac{Z_y(2)}{F_2} & \frac{Z_y(2)}{F_3} & \frac{Z_y(2)}{F_4} & \frac{Z_y(2)}{F_5} \\ \frac{Z_z(2)}{F_1} & \frac{Z_z(2)}{F_2} & \frac{Z_z(2)}{F_3} & \frac{Z_z(2)}{F_4} & \frac{Z_z(2)}{F_5} \end{bmatrix}$$

Performing generalized inverse matrix for equation (32) as equation (30), the following equation holds.

$$[H]=[Y]([X]^T)([X][X]^T)^{-1} \qquad \text{[Equation 33]}$$

[Y]([X] T) is as follows;

$$[Y]([X]^T) = \begin{bmatrix} O & P & Q \\ R & S & T \\ U & V & W \end{bmatrix} \qquad \text{[Equation 34]}$$

$$O = \frac{\left(\langle[\{Z_x(1)Z_x(2)F_2^2 + Z_x(1)Z_x(2)F_1^2\}F_3^2 + Z_x(1)Z_x(2)F_1^2F_2^2]F_4^2 + Z_x(1)Z_x(2)F_1^2F_2^2F_3^2\rangle F_5^2 + Z_x(1)Z_x(2)F_1^2F_2^2F_3^2F_4^2\right)}{(F_1^2F_2^2F_3^2F_4^2F_5^2)}$$

$$P = \frac{\left(\langle[\{Z_x(1)Z_y(2)F_2^2 + Z_x(1)Z_y(2)F_1^2\}F_3^2 + Z_x(1)Z_y(2)F_1^2F_2^2]F_4^2 + Z_x(1)Z_y(2)F_1^2F_2^2F_3^2\rangle F_5^2 + Z_x(1)Z_y(2)F_1^2F_2^2F_3^2F_4^2\right)}{(F_1^2F_2^2F_3^2F_4^2F_5^2)}$$

$$Q = \frac{\left(\langle[\{Z_x(1)Z_z(2)F_2^2 + Z_x(1)Z_z(2)F_1^2\}F_3^2 + Z_x(1)Z_z(2)F_1^2F_2^2]F_4^2 + Z_x(1)Z_z(2)F_1^2F_2^2F_3^2\rangle F_5^2 + Z_x(1)Z_z(2)F_1^2F_2^2F_3^2F_4^2\right)}{(F_1^2F_2^2F_3^2F_4^2F_5^2)}$$

$$R = \frac{\left(\langle[\{Z_y(1)Z_x(2)F_2^2 + Z_y(1)Z_x(2)F_1^2\}F_3^2 + Z_y(1)Z_x(2)F_1^2F_2^2]F_4^2 + Z_y(1)Z_x(2)F_1^2F_2^2F_3^2\rangle F_5^2 + Z_y(1)Z_x(2)F_1^2F_2^2F_3^2F_4^2\right)}{(F_1^2F_2^2F_3^2F_4^2F_5^2)}$$

-continued $$S = \frac{\left(\langle[\{Z_y(1)Z_y(2)F_2^2 + Z_y(1)Z_y(2)F_1^2\}F_3^2 + Z_y(1)Z_y(2)F_1^2F_2^2]F_4^2 + Z_y(1)Z_y(2)F_1^2F_2^2F_3^2\rangle F_5^2 + Z_y(1)Z_y(2)F_1^2F_2^2F_3^2F_4^2\right)}{(F_1^2F_2^2F_3^2F_4^2F_5^2)}$$

$$T = \frac{\left(\langle[\{Z_y(1)Z_z(2)F_2^2 + Z_y(1)Z_z(2)F_1^2\}F_3^2 + Z_y(1)Z_z(2)F_1^2F_2^2]F_4^2 + Z_y(1)Z_z(2)F_1^2F_2^2F_3^2\rangle F_5^2 + Z_y(1)Z_z(2)F_1^2F_2^2F_3^2F_4^2\right)}{(F_1^2F_2^2F_3^2F_4^2F_5^2)}$$

$$U = \frac{\left(\langle[\{Z_z(1)Z_x(2)F_2^2 + Z_z(1)Z_x(2)F_1^2\}F_3^2 + Z_z(1)Z_x(2)F_1^2F_2^2]F_4^2 + Z_z(1)Z_x(2)F_1^2F_2^2F_3^2\rangle F_5^2 + Z_z(1)Z_x(2)F_1^2F_2^2F_3^2F_4^2\right)}{(F_1^2F_2^2F_3^2F_4^2F_5^2)}$$

$$V = \frac{\left(\langle[\{Z_z(1)Z_y(2)F_2^2 + Z_z(1)Z_y(2)F_1^2\}F_3^2 + Z_z(1)Z_y(2)F_1^2F_2^2]F_4^2 + Z_z(1)Z_y(2)F_1^2F_2^2F_3^2\rangle F_5^2 + Z_z(1)Z_y(2)F_1^2F_2^2F_3^2F_4^2\right)}{(F_1^2F_2^2F_3^2F_4^2F_5^2)}$$

$$W = \frac{\left(\langle[\{Z_z(1)Z_z(2)F_2^2 + Z_z(1)Z_z(2)F_1^2\}F_3^2 + Z_z(1)Z_z(2)F_1^2F_2^2]F_4^2 + Z_z(1)Z_z(2)F_1^2F_2^2F_3^2\rangle F_5^2 + Z_z(1)Z_z(2)F_1^2F_2^2F_3^2F_4^2\right)}{(F_1^2F_2^2F_3^2F_4^2F_5^2)}$$

[Y]([X] T)−1 is as follows;

[Equation 35]

$$([X][X]^T)^{-1} = \begin{bmatrix} \dfrac{EI-FH}{A(EI-FH)+B(FG-DI)+C(DH-EG)} & \dfrac{CH-BI}{A(EI-FH)+B(FG-DI)+C(DH-EG)} & \dfrac{BF-CE}{A(EI-FH)+B(FG-DI)+C(DH-EG)} \\ \dfrac{FG-DI}{A(EI-FH)+B(FG-DI)+C(DH-EG)} & \dfrac{AI-CG}{A(EI-FH)+B(FG-DI)+C(DH-EG)} & \dfrac{CD-AF}{A(EI-FH)+B(FG-DI)+C(DH-EG)} \\ \dfrac{DH-EG}{A(EI-FH)+B(FG-DI)+C(DH-EG)} & \dfrac{BG-AH}{A(EI-FH)+B(FG-DI)+C(DH-EG)} & \dfrac{AE-BD}{A(EI-FH)+B(FG-DI)+C(DH-EG)} \end{bmatrix}$$

$$A = \frac{[\{(Z_x(2)^2F_2^2 + Z_x(2)^2F_1^2)F_3^2 + Z_x(2)^2F_1^2F_2^2\}F_4^2 + Z_x(2)^2F_1^2F_2^2F_3^2]F_5^2 + Z_x(2)^2F_1^2F_2^2F_3^2F_4^2}{F_1^2F_2^2F_3^2F_4^2F_5^2}$$

$$B = \frac{[\{(Z_x(2)Z_y(2)F_2^2 + Z_x(2)Z_y(2)F_1^2)F_3^2 + Z_x(2)Z_y(2)F_1^2F_2^2\}F_4^2 + Z_x(2)Z_y(2)F_1^2F_2^2F_3^2]F_5^2 + Z_x(2)Z_y(2)F_1^2F_2^2F_3^2F_4^2}{F_1^2F_2^2F_3^2F_4^2F_5^2}$$

$$C = \frac{[\{(Z_x(2)Z_z(2)F_2^2 + Z_x(2)Z_z(2)F_1^2)F_3^2 + Z_x(2)Z_z(2)F_1^2F_2^2\}F_4^2 + Z_x(2)Z_z(2)F_1^2F_2^2F_3^2]F_5^2 + Z_x(2)Z_z(2)F_1^2F_2^2F_3^2F_4^2}{F_1^2F_2^2F_3^2F_4^2F_5^2}$$

$$D = \frac{[\{(Z_x(2)Z_y(2)F_2^2 + Z_x(2)Z_y(2)F_1^2)F_3^2 + Z_x(2)Z_y(2)F_1^2F_2^2\}F_4^2 + Z_x(2)Z_y(2)F_1^2F_2^2F_3^2]F_5^2 + Z_x(2)Z_y(2)F_1^2F_2^2F_3^2F_4^2}{F_1^2F_2^2F_3^2F_4^2F_5^2}$$

$$E = \frac{[\{(Z_y(2)^2F_2^2 + Z_y(2)^2F_1^2)F_3^2 + Z_y(2)^2F_1^2F_2^2\}F_4^2 + Z_y(2)^2F_1^2F_2^2F_3^2]F_5^2 + Z_y(2)^2F_1^2F_2^2F_3^2F_4^2}{F_1^2F_2^2F_3^2F_4^2F_5^2}$$

-continued $$F = \frac{[\{(Z_y(2)Z_z(2)F_2^2 + Z_y(2)Z_z(2)F_1^2)F_3^2 + Z_y(2)Z_z(2)F_1^2F_2^2\}F_4^2 + Z_y(2)Z_z(2)F_1^2F_2^2F_3^2]F_5^2 + Z_y(2)Z_z(2)F_1^2F_2^2F_3^2F_4^2}{F_1^2F_2^2F_3^2F_4^2F_5^2}$$

$$G = \frac{[\{(Z_x(2)Z_z(2)F_2^2 + Z_x(2)Z_z(2)F_1^2)F_3^2 + Z_x(2)Z_z(2)F_1^2F_2^2\}F_4^2 + Z_x(2)Z_z(2)F_1^2F_2^2F_3^2]F_5^2 + Z_x(2)Z_z(2)F_1^2F_2^2F_3^2F_4^2}{F_1^2F_2^2F_3^2F_4^2F_5^2}$$

$$H = \frac{[\{(Z_y(2)Z_z(2)F_2^2 + Z_y(2)Z_z(2)F_1^2)F_3^2 + Z_y(2)Z_z(2)F_1^2F_2^2\}F_4^2 + Z_y(2)Z_z(2)F_1^2F_2^2F_3^2]F_5^2 + Z_y(2)Z_z(2)F_1^2F_2^2F_3^2F_4^2}{F_1^2F_2^2F_3^2F_4^2F_5^2}$$

$$I = \frac{[\{(Z_z(2)^2F_2^2 + Z_z(2)^2F_1^2)F_3^2 + Z_z(2)^2F_1^2F_2^2\}F_4^2 + Z_z(2)^2F_1^2F_2^2F_3^2]F_5^2 + Z_z(2)^2F_1^2F_2^2F_3^2F_4^2}{F_1^2F_2^2F_3^2F_4^2F_5^2}$$

From the above-described equations, the following equation holds;

$$\begin{bmatrix} \frac{Z_{xx}}{FF} & \frac{Z_{xy}}{FF} & \frac{Z_{xz}}{FF} \\ \frac{Z_{yx}}{FF} & \frac{Z_{yy}}{FF} & \frac{Z_{yz}}{FF} \\ \frac{Z_{zx}}{FF} & \frac{Z_{zy}}{FF} & \frac{Z_{zz}}{FF} \end{bmatrix} = \begin{bmatrix} O & P & Q \\ R & S & T \\ U & V & W \end{bmatrix}$$ [Equation 36]

$$\begin{bmatrix} \frac{EI-FH}{A(EI-FH)+B(FG-DI)+C(DH-EG)} & \frac{CH-BI}{A(EI-FH)+B(FG-DI)+C(DH-EG)} & \frac{BF-CE}{A(EI-FH)+B(FG-DI)+C(DH-EG)} \\ \frac{FG-DI}{A(EI-FH)+B(FG-DI)+C(DH-EG)} & \frac{AI-CG}{A(EI-FH)+B(FG-DI)+C(DH-EG)} & \frac{CD-AF}{A(EI-FH)+B(FG-DI)+C(DH-EG)} \\ \frac{DH-EG}{A(EI-FH)+B(FG-DI)+C(DH-EG)} & \frac{BG-AH}{A(EI-FH)+B(FG-DI)+C(DH-EG)} & \frac{AE-BD}{A(EI-FH)+B(FG-DI)+C(DH-EG)} \end{bmatrix}$$

While preferred working embodiments of this invention have been described using specific terms, such description is for illustrative purpose only, and it is to be understood that such modified working embodiments as described below may be made without departing from the spirit or scope of the appended claims:

(1) The vibration sensor 32 may be installed to the place other than the lower part of the crank case 5; for example, the vibration sensor 32 may be installed not only to a part of the casing 8 of the distance piece 6 or cylinder 8, etc. but also to the constituent member itself such as the crankshaft 9, the connecting rod 11, piston rod 17, etc.

(2) The crosshead 14 and the piston rod 17 shown in FIG. 3 may be removed and an equivalent model may be formed in which the connecting rod 11 is connected directly with the piston 24.

Such an equivalent model may be available for state-monitoring of, for example, an engine of vehicle.

(3) A signal from a casing or monitored object is not only the vibration wave-form, but various kinds of electric signals showing supersonic wave, sound, deformation, etc.

INDUSTRIAL APPLICABILITY

This invention may be applied not only to the state-monitoring system of reciprocating apparatus such as a reciprocating moving-type compressor, but also many other moving apparatuses providing with a casing and those without the casing as well.

For mass-produced products having nearly same qualities such as an automobile engine, etc., an equivalent model for one product of them is available; for the other products this invention is available as such, or slightly-modified one based on individual difference is available.

By obtaining data continuously by installing the system of this invention from the beginning of the use of the reciprocating apparatus, by storing data within a certain period of time or data within a restricted period time as a reference data (initial value) in a memory unit, detection of abnormality is made possible. That is to say, by comparison with the reference data, it is possible to detect where an abnormality occurs in an object to be monitored.

REFERENCE SIGNS LIST 1 moving apparatus
2 crank part
3 intermediate connecting part
4 piston-cylinder part
5 crank case
6 distance piece
7 cylinder
8 casing
9 crank shaft
9a crank pin
10 crank pin metal
11 connecting rod
12 crosshead pin
13 crosshead pin metal
14 crosshead
15 bolt
16 crosshead shoe
17 piston rod
18 oil wiper ring
19 intermediate gland packing
19a cap screw
20 gland packing
21 coolant passageway
22 piston ring 23 rider ring
24 piston
25 cylinder liner
26 gas inlet
27 suction valve
28 discharge valve
29 gas outlet
30 suction valve open-type unloader
31 state-monitoring system
32 vibration sensor
33 output interface
34 vibration measuring unit
35 casing vibration measuring-part
36 cable
37 input interface
38 personal computer
39 simulator
40 parameter storing-part
41 parameter identifying-part
42 parameter change verifying-part
43 parameter change trend judging-part
44 abnormality judging-part
45 breakdown data memory
46 warning apparatus
47 frequency analyzing-part
48 frequency characteristics change verifying-part
49 characteristic value analyzing-part
50 characteristic value change verifying-part
51 result-memory unit
52 change trend judging-part
D dashpot (viscoelastic member)
S elastic spring (viscoelastic member)

The invention claimed is:

1. A state monitoring system of a reciprocating-type compressor comprising:
a personal computer including a processor and a memory, and
a vibration sensor configured to measure the vibrations of the reciprocating-type compressor during operation of said reciprocating-type compressor and to output a waveform of measured vibration data, wherein:
the reciprocating-type compressor comprises one or more constituent members that are to be monitored and that are to be located inside a casing of said reciprocating type compressor;
the vibration sensor is located at one or plural sites of the reciprocating-type compressor including at least one of a lower part of the crank case, a casing of the distance piece or cylinder, or the constituent member;
the processor functions as a simulator comprising a model of said reciprocating-type compressor;
the simulator replaces vibrations caused by characteristics of said constituent members and/or a connecting part between constituent members and/or a sliding part with vibrations caused by said characteristics of a viscoelastic member; and
the processor is configured to output virtual vibration data having vibrations equivalent to synthesized vibrations of the viscoelastic member;
the memory functions as a parameter memory unit for storing the parameter of a spring constant or the spring constant and a viscous damping coefficient of said viscoelastic member;
the stored parameter is obtained by operating said simulator so that the waveform of said virtual vibration data output from said model of said simulator is made substantially to match the measured waveform output by the vibration sensor during normal operation of the reciprocating-type compressor;
the processor functions as a parameter identifying part in which by changing the parameters of said viscoelastic member, the waveforms of the virtual vibration data output from the model are made substantially to match the vibration waveforms obtained at the arbitrary one or plural sites during actual operation of the reciprocating-type compressor;
the processor functions as a parameter-change verifying part which verifies how said parameters change during actual operation identified by said parameter-identifying part in comparison with parameters of said reciprocating-type compressor during normal operation stored in said parameter-memory unit; and
the processor outputs a warning when the change in said parameters indicates that a breakdown is estimated.

2. A state monitoring system of a reciprocating-type compressor comprising:
a personal computer including a processor and a memory, and
a vibration sensor configured to measure the vibrations of the reciprocating-type compressor during operation of said reciprocating-type compressor and to output a waveform of measured vibration data, wherein:
the reciprocating-type compressor comprises one or more constituent members that are to be monitored and that are to be located inside a casing of said reciprocating type compressor;
the vibration sensor is located at one or plural sites of the reciprocating -type compressor including at least one of a lower part of the crank case, a casing of the distance piece or cylinder, or the constituent member;
the processor functions as a simulator comprising a model of the reciprocating-type compressor;
the simulator replaces vibrations caused by characteristics of the constituent members and/or a connecting part between said constituent members and/or a sliding part with vibrations caused by the characteristics of a viscoelastic member; and
the processor is configured to output virtual vibration data equivalent to each of vibrations of said viscoelastic member replaced corresponding to each of vibrations of preliminarily-selected arbitrary plural monitored objects among said monitored objects, the vibration of which is measured during actual operation, or virtual vibration data on vibrations equivalent to synthesized vibrations of said viscoelastic member replaced corresponding to each of vibrations of preliminarily selected arbitrary plural monitored objects;
the memory functions as a parameter memory unit for storing the parameters of a spring constant or the spring constant and a viscous damping coefficient of said viscoelastic member;
the stored parameters are obtained by operating said simulator so that the waveform of said virtual vibration data output from said model of said simulator is made substantially to match the measured waveforms output by the vibration sensor during actual operation of said reciprocating-type compressor, or a synthesized waveform of each of measured vibration data of said preliminarily-selected arbitrary plural monitored objects, as parameters of said reciprocating-type compressor during normal operation;

the processor functions as a parameter-identifying part in which by operating said simulator by changing said parameters of said viscoelastic member, said waveform of said virtual vibration data output from said model is made to match substantially with a vibration waveform during actual operation obtained at said monitored object vibration measuring part or with a waveform of said synchronized vibrations;

the processor functions as a parameter-change verifying part which verifies how said parameters change during actual operation identified by said parameter-identifying part in comparison with said parameters during normal operation of said reciprocating-type compressor stored in said parameter memory unit; and the processor outputs a warning when the change in said parameters indicates that a breakdown is estimated.

3. The state monitoring system of a reciprocating-type compressor described in claim 1, wherein said viscoelastic member is an elastic spring.

4. The state monitoring system of a reciprocating-type compressor described in claim 1, wherein said viscoelastic member comprises an elastic spring and a dashpot.

5. The state monitoring system of a reciprocating-type compressor described in claim 1, further comprising a parameter change-trend -judging part for judging the trend of change of said constituent members to be monitored of the reciprocating-type compressor and/or connecting part between the constituent members and/or a sliding part, by means of changing states of the parameters during actual operation verified in the parameter-verifying part.

6. The state monitoring system of a reciprocating-type compressor described in claim 1, further comprising an abnormalities-judging part for judging an abnormal state of said constituent members to be monitored of the reciprocating-type compressor and/or the connecting part between the constituent members and/or the sliding part, by comparing the variation of the parameters during actual operation verified in the parameter-change verifying part with threshold value previously set on the basis of the parameter at the normal operation.

7. The state monitoring system of a reciprocating-type compressor described in claim 1, wherein said reciprocating-type compressor is provided with an electric motor, a crankshaft, a connecting rod, and a piston, and said model is provided with virtual rigid bodies of a crankshaft, a connecting rod, and a piston.

8. The state monitoring system of a reciprocating-type compressor described in claim 2, wherein said viscoelastic member is an elastic spring.

9. The state monitoring system of a reciprocating-type compressor described in claim 2, wherein said viscoelastic member comprises an elastic spring and a dashpot.

10. The state monitoring system of a reciprocating-type compressor described in claim 2, further comprising a parameter change-trend -judging part for judging the trend of change of said constituent members to be monitored of the reciprocating-type compressor and/or connecting part between the constituent members and/or a sliding part, by means of changing states of the parameters during actual operation verified in the parameter-verifying part.

11. The state monitoring system of a reciprocating-type compressor described in claim 2, further comprising an abnormalities-judging part for judging an abnormal state of said constituent members to be monitored of the reciprocating-type compressor and/or the connecting part between the constituent members and/or the sliding part, by comparing the variation of the parameters during actual operation verified in the parameter-change verifying part with threshold value previously set on the basis of the parameter at the normal operation.

12. The state monitoring system of a reciprocating-type compressor described in claim 2, wherein said reciprocating-type compressor is provided with an electric motor, a crankshaft, a connecting rod, and a piston, and said model is provided with virtual rigid bodies of a crankshaft, a connecting rod, and a piston.

* * * * *